(12) United States Patent
Mehr

(10) Patent No.: US 9,935,769 B1
(45) Date of Patent: Apr. 3, 2018

(54) RESOURCE-BASED CIPHER SUITE SELECTION

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 111 days.

(21) Appl. No.: 14/569,612

(22) Filed: Dec. 12, 2014

(51) Int. Cl.
*H04L 29/06* (2006.01)
*G06F 17/30* (2006.01)
*H04L 9/14* (2006.01)
*H04L 9/12* (2006.01)

(52) U.S. Cl.
CPC .................................... *H04L 9/12* (2013.01)

(58) Field of Classification Search
CPC ............ H04L 63/0428; H04L 63/0435; H04L 63/0552; H04L 63/045; H04L 63/0457; H04L 9/14; H04L 9/16
USPC ........................................................ 713/150
See application file for complete search history.

(56) References Cited

U.S. PATENT DOCUMENTS

| | | |
|---|---|---|
| 2007/0226807 A1 | 9/2007 | Ginter et al. |
| 2011/0154038 A1 | 6/2011 | Qi et al. |
| 2014/0280952 A1 | 9/2014 | Shear et al. |
| 2014/0289826 A1 | 9/2014 | Croome |

OTHER PUBLICATIONS

T. Dierks; C. Allen; "The TLS Protocol", Version 1.0, Network Working Group, Request for Comments: 2246, Certicom, Jan. 1999.*
Gutmann, "Encrypt-then-MAC for Transport Layer Security (TLS) and Datagram Transport Layer Security (DTLS)," Request for Comments: 7366, Standards Track, Sep. 2014, 7 pages.
Merkle et al., "Elliptic Curve Cryptography (ECC) Brainpool Curves for Transport Layer Security (TLS)," Request for Comments: 7027, Informational, Oct. 2013, 11 pages.
McGrew et al., "AES-CCM Cipher Suites for Transport Layer Security (TLS)," Request for Comments: 6655, Standards Track, Jul. 2012, 8 pages.
Salter et al., "Suite B Profile for Transport Layer Security (TLS)," Request for Comments: 6460, Informational, Jan. 2012, 15 pages.
Kanno et al., "Addition of the Camellia Cipher Suites to Transport Layer Security (TLS)," Request for Comments: 6367, Informational, Sep. 2011, 9 pages.

(Continued)

*Primary Examiner* — Alexander Lagor
(74) *Attorney, Agent, or Firm* — Davis Wright Tremaine LLP

(57) ABSTRACT

Cipher suites and/or other parameters for cryptographic protection of communications are dynamically selected to more closely match the intended uses of the sessions. A client indicates a planned use of a session to a server. The client's indication of the planned use may be explicit or implicit. The server selects an appropriate set of parameters for cryptographic protection of communications based at least in part on the indicated planned use and the client and server complete a handshake process to establish a cryptographically protected communications session to use the selected set of parameters.

20 Claims, 9 Drawing Sheets

(56) References Cited

OTHER PUBLICATIONS

Rescorla et al., "Datagram Transport Layer Security Version 1.2," Request for Comments: 6347, Standards Track, Jan. 2012, 33 pages.
Kim et al., "Addition of the ARIA Cipher Suites to Transport Layer Security (TLS)," Request for Comments: 6209, Informational, Apr. 2011, 10 pages.
Turner et al., "Prohibiting Secure Sockets Layer (SSL) Version 2.0," Request for Comments: 6176, Standards Track, Mar. 2011, 4 pages.
Mavrogiannopoulos et al., "Using OpenPGP Keys for Transport Layer Security (TLS) Authentication," Request for Comments: 6091, Informational, Feb. 2011, 9 pages.
Eastlake, "Transport Layer Security (TLS) Extensions: Extension Definitions," Request for Comments: 6066, Standards Track, Jan. 2011, 25 pages.
Tuexen et al., "Datagram Transport Layer Security (DTLS) for Stream Control Transmission Protocol (SCTP)," Request for Comments: 6083, Standards Track, Jan. 2011, 10 pages.
Kato et al., "Camellia Cipher Suites for TLS," Request for Comments: 5932, Standards Track, Jun. 2010, 7 pages.
Brown et al., "Transport Layer Security (TLS) Authorization Extensions," Request for Comments: 5878, Experimental, May 2010, 19 pages.
McGrew et al., "Datagram Transport Layer Security (DTLS) Extension to Establish Keys for the Secure Real-time Transport Protocol (SRTP)," Request for Comments: 5764, Standards Track, May 2010, 27 pages.
Rescorla et al., "Transport Layer Security (TLS) Renegotiation Indication Extension," Request for Comments: 5746, Standards Track, Feb. 2010, 16 pages.
Rescorla, "TLS Elliptic Curve Cipher Suites with SHA-256/384 and AES Galois Counter Mode (GCM)," Request for Comments: 5289, Informational, Aug. 2008, 7 pages.
Salowey et al., "AES Galois Counter Mode (GCM) Cipher Suites for TLS," Request for Comments: 5288, Standards Track, Aug. 2008, 9 pages.
Dierks et al., "The Transport Layer Security (TLS) Protocol Version 1.2," Request for Comments: 5246, Standards Track, Aug. 2008, 98 pages.
Phelan, "Datagram Transport Layer Security (DTLS) over the Datagram Congestion Control Protocol (DCCP)," Request for Comments: 5238, Standards Track, May 2008, 11 pages.
Mavrogiannopoulos, "Using OpenPGP Keys for Transport Layer Security (TLS) Authentication," Request for Comments: 5081, Experimental, Nov. 2007, 9 pages.
Salowey et al., "Transport Layer Security (TLS) Session Resumption without Server-Side State," Request for Comments: 5077, Standards Track, Jan. 2008, 21 pages.
Taylor et al., "Using the Secure Remote Password (SRP) Protocol for TLS Authentication," Request for Comments: 5054, Informational, Nov. 2007, 25 pages.
Blumenthal et al., "Pre-Shared Key (PSK) Ciphersuites with NULL Encryption for Transport Layer Security (TLS)," Request for Comments: 4785, Standards Track, Jan. 2007, 6 pages.
Santesson et al., "TLS User Mapping Extension," Request for Comments: 4681, Standards Track, Oct. 2006, 11 pages.
Santesson, "TLS Handshake Message for Supplemental Data," Request for Comments: 4680, Standards Track, Sep. 2006, 10 pages.
Blake-Wilson et al., "Elliptic Curve Cryptography (ECC) Cipher Suites for Transport Layer Security (TLS)," Request for Comments: 4492, Informational, May 2006, 36 pages.
Blake-Wilson et al., "Transport Layer Security (TLS) Extensions," Request for Comments: 4366, Standards Track, Apr. 2006, 29 pages.
Rescorla et al., "Datagram Transport Layer Security," Request for Comments: 4347, Standards Track, Apr. 2006, 26 pages.
Eronen et al., "Pre-Shared Key Ciphersuites for Transport Layer Security (TLS)," Request for Comments: 4279, Standards Track, Dec. 2005, 16 pages.
Ford-Hutchinson, "Securing FTP with TLS," Request for Comments: 4217, Standards Track, Oct. 2005, 29 pages.
Lee et al., "Addition of SEED Cipher Suites to Transport Layer Security (TLS)," Request for Comments: 4162, Standards Track, Aug. 2005, 7 pages.
Moriai et al., "Addition of Camellia Cipher Suites to Transport Layer Security (TLS)," Request for Comments: 4132, Standards Track, Jul. 2005, 8 pages.
Friend, "Transport Layer Security (TLS) Protocol Compression Using Lempel-Ziv-Stac (LZS)," Request for Comments: 3943, Informational, Nov. 2004, 13 pages.
Hollenbeck, "Transport Layer Security Protocol Compression Methods," Request for Comments: 3749, Standards Track, May 2004, 8 pages.
Blake-Wilson et al., "Transport Layer Security (TLS) Extensions," Request for Comments: 3546, Standards Track, Jun. 2003, 28 pages.
Chown, "Advanced Encryption Standard (AES) Ciphersuites for Transport Layer Security (TLS)," Request for Comments: 3268, Standards Track, Jun. 2002, 8 pages.
Hoffman, "SMTP Service Extension for Secure SMTP over Transport Layer Security," Request for Comments: 3207, Standards Track, Feb. 2002, 9 pages.
Dierks et al., "The TLS Protocol Version 1.0," Request for Comments: 2246, Standards Track, Jan. 1999, 75 pages.
Newman, "Using TLS with IMAP, POP3 and ACAP," Request for Comments: 2595, Standards Track, Jun. 1999, 16 pages.
Medvinsky et al., "Addition of Kerberos Cipher Suites to Transport Layer Security (TLS)," Request for Comments: 2712, Standards Track, Oct. 1999, 7 pages.
Khare et al., "Upgrading to TLS Within HTTP/1.1," Request for Comments: 2817, Standards Track, May 2000, 13 pages.
Rescorla, "HTTP Over TLS," Request for Comments: 2818, Informational, May 2000, 8 pages.
LAN/MAN Standards Committee, "Part II: Wireless LAN Medium Access Control (MAC) and Physical Layer (PHY) Specifications—Amendment 4: Enhancementes for Very High Throughput for Operation in Bands below 6 GHz," Dec. 11, 2013, IEEE Computer Society, Std 802.11ac-2013, 425 pages.
Moore, "Use of EAPOL-Key messages," Microsoft, May 2004, doc.: IEEE 802.11-04/534r0, Slides 1-6.

* cited by examiner

RESOURCE-BASED CIPHER SUITE SELECTION

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Modern cryptographic algorithms provide high levels of data security. Current encryption methods, for example, can secure data such that unauthorized access to the data requires an impractical amount of time and/or resources. Such high-levels of protection, however, come at a cost. Generally speaking, higher levels of protection require higher levels of care and greater expenditure of computational resources. At the same time, not all transactions, however, require the highest available levels of security. As an example, data is often communicated from one computer to another using hypertext transfer protocol secure (HTTPS), even when the data is publicly available. Generally, a lot of computational resources is spent unnecessarily, resulting in higher latencies, higher energy usage, among other issues.

BRIEF DESCRIPTION OF THE DRAWINGS

Various embodiments in accordance with the present disclosure will be described with reference to the drawings, in which.

DETAILED DESCRIPTION

Figure 1:
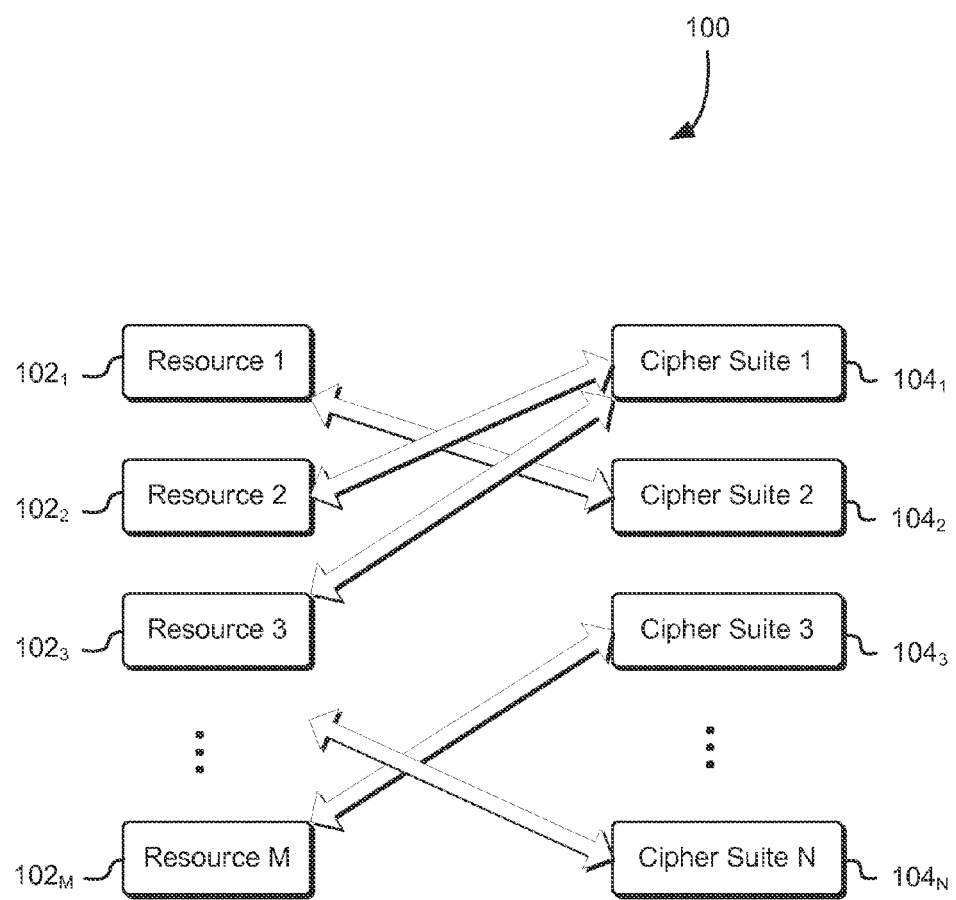
FIG. 1 shows a diagram illustrating a matching of resources to cipher suites in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein involve dynamic cipher suite selection based on planned session use. In an embodiment, during a handshake process to establish a cryptographically protected communications session, such as a secure sockets layer (SSL) or transport layer security (TLS) session, a client indicates to a server a planned use of the session. The server then selects a cipher suite appropriate to the client's planned use of the session and completes the handshake accordingly. The server may be configured to select a cipher suite with cryptographic properties appropriate to the planned use. Cipher suites appropriate to planned uses may be a configurable setting and, in some examples, a setting that is configurable through application programming interface (API) requests.

The client may specify the planned use of the session in various ways in various embodiments. In some examples, each of a plurality of possible planned uses may have a corresponding identifier and the client can include such an identifier in a message to the server. The identifier may be, for instance, an identifier of a security level, thereby indicating that the planned use is the performance of operations allowable for that security level. In other examples, the planned use is resource-specific and indicated by an identifier of a resource involved in fulfillment of a request that will be submitted. The identifier may, for instance, identify a data object (e.g., audio file, video file, document, record, or other collection of data) to be requested. Access control information associated with the resource may indicate a set of cipher suites suitable for certain actions performable in connection with the resource, such as (when applicable) transfer of the resource over a network.

Techniques of the present disclosure also allow for access control based at least in part on cipher suites in use to submit requests. In an embodiment, a cryptographically protected communications session utilizing a cipher suite is established between a client and a server. The cryptographically protected communications session may be used by a client to submit a request over the session. For example, the request may be encrypted if encryption is a cryptographic protection of the cipher suite. The server may determine whether the cipher suite is sufficient for fulfillment of the request. In some examples, the cipher suite is insufficient if it is not cryptographically strong enough. In other examples, the cipher suite is insufficient if it requires computational resources (e.g., central processing unit cycles) that are in excess of that which is needed. For example, otherwise publicly available data may not require encryption and, therefore, a cipher suite that only offers cryptographic protection in the form of data authentication may be more suitable than a cipher suite that utilizes encryption as well. The sufficiency and/or insufficiency of cipher suites may be predetermined in accordance with access control information to enable a computer system to make an automated determination as to whether a cipher suite is suitable for fulfillment of a pending request.

Various techniques may be employed if a cipher suite of a session over which a request is submitted is insufficient. In some examples, the request is simply denied. Denial of the request may be in the form of a response to the request (e.g., a web service response) that indicates the reason for the denial, to enable a client to renegotiate a session with a suitable cipher suite. The response may specify, explicitly or implicitly, a set of cipher suites that would be suitable. In other examples, instead of immediately denying the request, the server may send a message that causes the cryptographically protected communications session to be renegotiated to use a different cipher suite (i.e., one that is suitable for fulfillment of the request). The message may be, for instance, a TLS Hello Request message that causes a client to send a Client Hello message, thereby causing a renegotiation to occur. The server may, as part of the renegotiation, select a cipher suite that is suitable for fulfillment of the request (if available) such that the response can be provided over the new cryptographically protected communications session that results. In yet other examples, the server may transmit an application-layer communication to the client that provides a warning to the client regarding the insufficiency of the cipher suite. The client may (e.g., responsive to user input or in an automated fashion) transmit an instruction to the server that indicates to the server whether the server should provide the response over the current session. The server may operate accordingly. Other examples and variations are discussed below.

FIG. 1 shows a diagram 100 illustrating various aspects in the present disclosure. As noted above techniques of the present disclosure allow for cipher suite selection based at least in part on a purpose (planned use) for a cryptographically protected communications session to be established. A cipher suite, in an embodiment, is a collection of cryptographic algorithms, each for a different cryptographic protection. In some examples, a cipher suite comprises an authentication algorithm, an encryption algorithm, a message authentication code (MAC) algorithm, and a key exchange algorithm. In various embodiments, instead of naively selecting the most secure cipher suite mutually supported by a client and a server, the techniques of the present disclosure allow for efficiency gains by allowing for selection of cipher suites that are more appropriate for communications that will traverse the network.

In various embodiments cryptographically protected communications sessions are used for the purpose of accessing resources. The cryptographically protected communications sessions may be used for example, for the transfer of data from one entity to another such as from a client to a server or from the client to the server. The cryptographically protected communications session may be used for instance to ensure integrity of the data traversing a network between the entities and/or to ensure confidentiality of the data as it traverses the network. In the diagram 100 illustrated in FIG. 1, there may be a plurality of resources which in the diagram are labeled as resources 1 through M. The resources $102_1$-$102_M$ may be for instance, data files accessible to a server computer system. Different resources may have different security requirements. For example, a resource may comprise public data and, as a result, there may be little or no need for confidentiality as the data traverse a network. However, other data may be sensitive, such as health records, private photographs, files with personally identifying information (PII), and others. Generally, different resources may have different security needs and, as a result, the most appropriate cipher suite for any particular resource may vary among the resources.

As illustrated in FIG. 1 the various resources $102_1$-$102_M$ correspond to different cipher suites $104_1$-$104_N$. The different cipher suites $104_1$-$104_N$ may have different properties that make them more suitable in different circumstances. Some cipher suites for instance may not provide any data confidentiality but only data integrity. Such cipher suites may be suitable for instance, for data that are publicly available and generally for which confidentiality is not a requirement. Such cipher suites may provide the advantage in that assurance that data has not become corrupted while traversing a network are available while there is no need to utilize processing capacity for the purpose of encryption and decryption. Some cipher suites may provide data confidentiality but may be cryptographically weaker than other cipher suites. Cryptographic strength may be measured in various ways in accordance with various embodiments. For instance, cipher suites may be ranked in accordance with current understandings of resistance to cryptographic attacks. Cryptographic strength may also be measured in key size for an encryption or other algorithm of the cipher suite. Other properties of cryptographic algorithms may also be used to determine cryptographic strength. Such a cipher suite (i.e., a cipher suite that is cryptographically weaker than others) may be useful for instance, when data confidentiality is desired but not absolutely so. In this manner a level of data confidentiality may be attained while spending less processing resources than would be required for cryptographically stronger cipher suites. Finally, some cipher suites may be cryptographically strong requiring more processing capacity for encryption and decryption and therefore may be suitable in instances where the confidentiality is of greater importance.

As illustrated in FIG. 1, various resources may have corresponding cipher suites that are suitable for the transfer of data over a network. Resources may have a corresponding cipher suite in various ways in accordance with various embodiments, some of which are discussed in more detail below. In some examples, each resource may be tagged (e.g., in metadata, discussed below) with a set of suitable cipher suites for the resource. A tag may be for example metadata of the resource stored in association with a resource in a data storage system. A set of cipher suites suitable for the resource may be specified in various ways, in various embodiments. In some examples, a resource may be associated explicitly with all cipher suites suitable for that resource. A system to which the resource is accessible may transfer the resource over a network only using a cipher suite explicitly identified in the set. As another example, a resource may be associated with a single cipher suite and a set of cipher suites may be ranked. Transfer of the resource over a network may be allowed for instance, using the specified cipher suite and any cipher suite ranked higher in accordance with cryptographic strength. As yet another example, a resource may be tagged with a security level and other data may associate that security level with a set of cipher suites suitable for the resource.

Resources may be associated with suitable cipher suites in other ways in accordance with various embodiments. For instance, resources may be categorized by security level and each security level may have a corresponding set of cipher suites that are suitable for transfer of resources associated with that security level. As yet another example, a logical container for resources (which may be referred to as a logical data container or a bucket) may be an identifier with which multiple resources may be associated) may have a corresponding set of cipher suites. A logical data container may be identified in various ways in accordance with various embodiments, such as by a globally unique identifier (GUID), a file path or portion of a file path, a common prefix for a set of identifiers, by a URI, or otherwise. Any resources in the logical data container (i.e., associated with the identifier), may be considered to have the corresponding set of suitable cipher suites. Other variations are also considered as being within the scope of the present disclosure.

Figure 2:
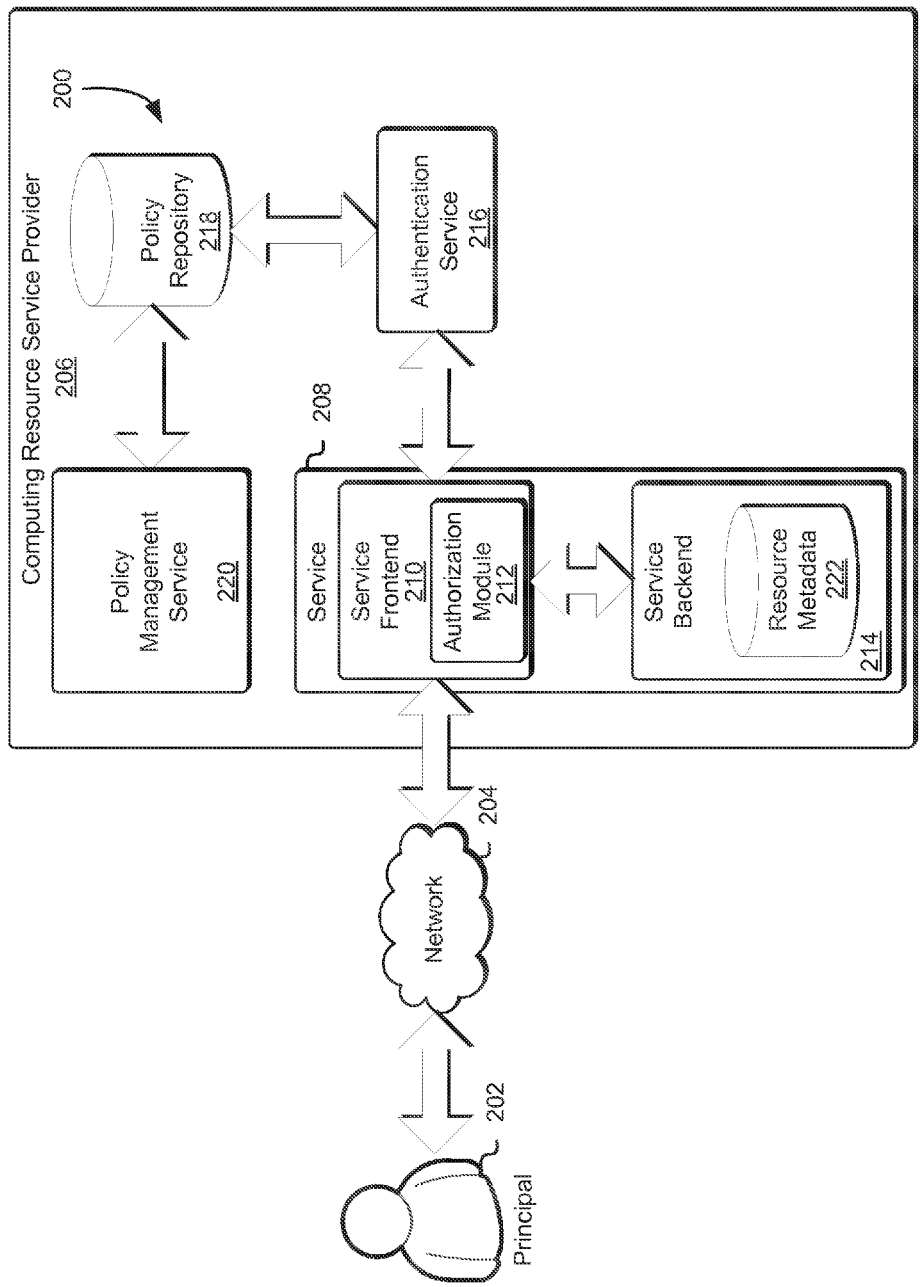
FIG. 2 shows an illustrative example of an environment in which various embodiments can be implemented.

FIG. 2 is an illustrative example of an environment 200 in which various embodiments of the present disclosure can be practiced. In an embodiment, a principal 202 may use a computing device to communicate over a network 204 with a computing resource service provider 206. Communications between the computing resource service provider 206 and the principal 202 may, for instance, be for the purpose of accessing a service 208 operated by the service provider 206, which may be one of many services operated by the service provider 206. The service 208 may comprise a service frontend 210 and a service backend 214. The principal 202 may issue a request for access to a service 208 (and/or a request for access to resources associated with the service 208) provided by a computing resource service provider 206. The request may be, for instance, a web service application programming interface request. The principal may be a user, or a group of users, or a role associated with a group of users, or a process representing one or more of these entities that may be running on one or more remote (relative to the computing resource service provider 206) computer systems, or may be some other such computer system entity, user, or process. Generally, a principal is an entity corresponding to an identity managed by the computing resource service provider, where the computing resource service provider manages permissions for the identity. Note, however, that embodiments of the present disclosure extend to identities not managed by the computing resource service provider, such as when identities are anonymous or otherwise unspecified. For example, a policy may apply to anonymous principals.

The principal 202 may correspond to an identity managed by the computing resource service provider 206, such as by the policy management service or another service. The identity may be one of multiple identities managed for an account of a customer of the computing resource service provider, and the computing resource service provider may manage accounts for multiple customers. Note that, while the principal 202 may correspond to a human, such a human may communicate with the computing resource service provider 206 through a suitably configured computing device which may perform operations (e.g., generation and transmission of requests) on behalf of the principal 202. The principal 202 may communicate with the computing resource service provider 206 via one or more connections (e.g., transmission control protocol (TCP) connections). The principal 202 may use a computer system client device to connect to the computing resource service provider 206. The client device may include any device that is capable of connecting with a computer system via a network, such as example devices discussed below. The network 204 may include, for example, the Internet or another network or combination of networks discussed below.

The computing resource service provider 206, through the service 208, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments. Note that such services and resources are provided for the purpose of illustration and embodiments of the present disclosure may utilize other services and/or resources.

The request for access to the service 208 which, in some examples, is a web service application programming interface request (also referred to simply as a web service request), may be received by a service frontend 210. The service frontend 210 may be a system comprising a set of web servers (e.g., a single web server or a set of web servers which may be managed by a load balancer). Web servers of the frontend 210 may be configured to receive such requests and to process them according to one or more policies associated with the service 208. Web servers or other components of the frontend 210 may be configured to operate in accordance with one or more SSL and/or TLS protocols, such as referenced herein. The request for access to the service 208 may be a digitally signed request and, as a result, may be provided with a digital signature. The service frontend 210 may then send the request and the digital signature for verification to an authentication service 216. The authentication service 216 may be a stand-alone service or may be part of a service provider or other entity. The authentication service 216, in an embodiment, is a computer system configured to perform operations involved in authentication of principals. In some examples, requests submitted to the service frontend 210 are digitally signed by the principal (i.e., by a computing device used by or operating on behalf of the principal) using a symmetric cryptographic key that is shared between the principal 202 and the authentication service 216. The authentication service, therefore, may use a copy of the symmetric cryptographic key to verify digital signatures of requests purported to have been generated by the principal 202. However, in other embodiments, the authentication service 216 may be configured to utilize asymmetric cryptography for digital signature verification such as, for example, when the principal digitally signs requests using a private cryptographic key. In such embodiments, the authentication service may be configured to trust a certificate authority that digitally signed a certificate of the principal 202 corresponding to the private cryptographic key. Consequently, in some embodiments, the authentication service may use a public cryptographic key specified by the certificate. Generally, the authentication service may utilize a cryptographic key that is registered with the authentication service 216 in association with the principal 202.

Upon successful authentication of a request, the authentication service 216 may then obtain policies applicable to the request. A policy may be a set of information that defines a set of permissions with respect to a set of resources. The policy may be applicable to the request by way of being associated with the principal 202, a resource to be accessed as part of fulfillment of the request, a group in which the principal 202 is a member, a role the principal 202 has assumed, and/or otherwise. To obtain policies applicable to the request, the authentication service 216 may transmit a query to a policy repository 218 managed by a policy management service 220, which may be the policy management service discussed above in connection with FIG. 1. The query may be a request comprising information sufficient to determine a set of policies applicable to the request. The query may, for instance, contain a copy of the request and/or contain parameters based at least in part on information in the request, such as information identifying the principal, the resource, and/or an action (operation to be performed as part of fulfillment of the request). The policy repository, which may be a database or other system operable to process queries, may process the query by providing any policies applicable to the request. Note that, if authentication of the request is unsuccessful (e.g., because a digital signature could not be verified), policies applicable to the request may not be obtained.

Having obtained any policies applicable to the request, the authentication service 216 may provide an authentication response and, if applicable (e.g., when there is a positive authentication response), the obtained policies back to the service frontend 210. The authentication response may indicate whether the response was successfully authenticated. The service frontend 210 may then check whether the fulfillment of the request for access to the service 208 would comply with the obtained policies using an authorization module 212.

An authorization module 212 may be a process executing on the service frontend that is operable to compare the request to the one or more permissions in the policy to determine whether service is authorized to satisfy the request (i.e., whether fulfillment of the request is authorized). For example, the authorization module may compare an API call associated with the request against permitted API calls specified by the policy to determine if the request is allowed. If the authorization module 212 is not able to match the request to a permission specified by the policy, the authorization module 212 may execute one or more default actions such as, for example, providing a message to the service frontend that causes the service frontend to deny the request, and causing the denied request to be logged in the policy management service 220. If the authorization matches the request to one or more permissions specified by the policy, the authorization module 212 may resolve this by selecting the least restrictive response (as defined by the policy) and by informing the service frontend whether the fulfillment of the request is authorized (i.e., complies with applicable policy) based on that selected response. The authorization module 212 may also select the most restrictive response or may select some other such response and inform the service frontend whether the fulfillment of the request is authorized based on that selected response. Note that, while FIG. 2 shows the authorization module 212 as a component of the service frontend 210, in some embodiments, the authorization module 212 is a separate service provided by the computing resource service provider 206 and the frontend service may communicate with the authorization module 212 over a network.

In an embodiment, the service backend 214 maintains a repository 222 of resource metadata (resource metadata repository) that contains metadata about the resources managed by the service 208. The metadata may contain various information about the resources, which may depend on the specific type(s) of resources managed by the service 208. Metadata may include, for instance, size of data objects, numbers of data objects in logical data containers, lifecycle information, such as creation dates, edit dates, and other dates, and other information that may be relevant to the resources managed by the service 208. In some embodiments, the resource metadata contains access control information (e.g., policies) additional to access control information stored in policies in the policy repository. The service frontend 210 may be configured to, when a request is received from the principal 202, query the service backend 214 for any applicable access control information and use any returned access control information in determining whether and/or how to fulfill a request. As with access control information discussed above (e.g., policies), access control information may contain conditions associated with resources and/or principals that define rules for access of the resources.

In some examples, access control information stored in a policy or resource metadata repository is associated with resources and specifies a set of cipher suites suitable for the resources. For a particular resource, the access control information may specify or otherwise indicate a set of cipher suites such that, to fulfill an API request received over a cryptographically protected communications session and involving the resource, the cryptographically protected communications session must utilize a cipher suite in the set. The set may be specified explicitly (e.g., with an identifier for each cipher suite in the set and/or an identifier for the set), implicitly (e.g., with a security level for the resource), and/or otherwise. As with other access control information, the access control information may specify conditions involving when requirements regarding cipher suites apply, such as which API requests the requirements apply to (i.e., which type(s) of requests), which may be all API requests whose fulfillment involves access to the resource, which principals the requirements apply to (which may be all principals), and other requirements. In some examples, access control information specifies conditions involving contextual information which, for an API request, which may include a source network address (e.g., source Internet Protocol (IP) address), a time of day when the request is submitted, a network from which the request is submitted (e.g., an identifier of a private network or a subnet of a private network), and other information. In one example, a source network address of an API request may be mapped to a geographic location (which may be defined in various ways, such as in accordance with geopolitical boundaries and/or legal jurisdictions) and applicability of one or more conditions may apply to the geographic location. For instance, certain geographic locations may require certain cipher suites be in use for fulfillment of certain requests (e.g., requests whose fulfillment involves access to certain resources).

Note that, while FIG. 2 shows a particular configuration of a distributed system of a computing resource service provider, other configurations are also considered as being considered within the scope of the present disclosure. For example, authentication and authorization determinations may be made by different components of a distributed system (e.g., the service frontend 210). As another example, applicable request-mapping rules and authorization rules may be stored in the policy repository and part of obtaining applicable policy may include application of the request-mapping rules to determine the proper authentication rules 226.

Figure 3:
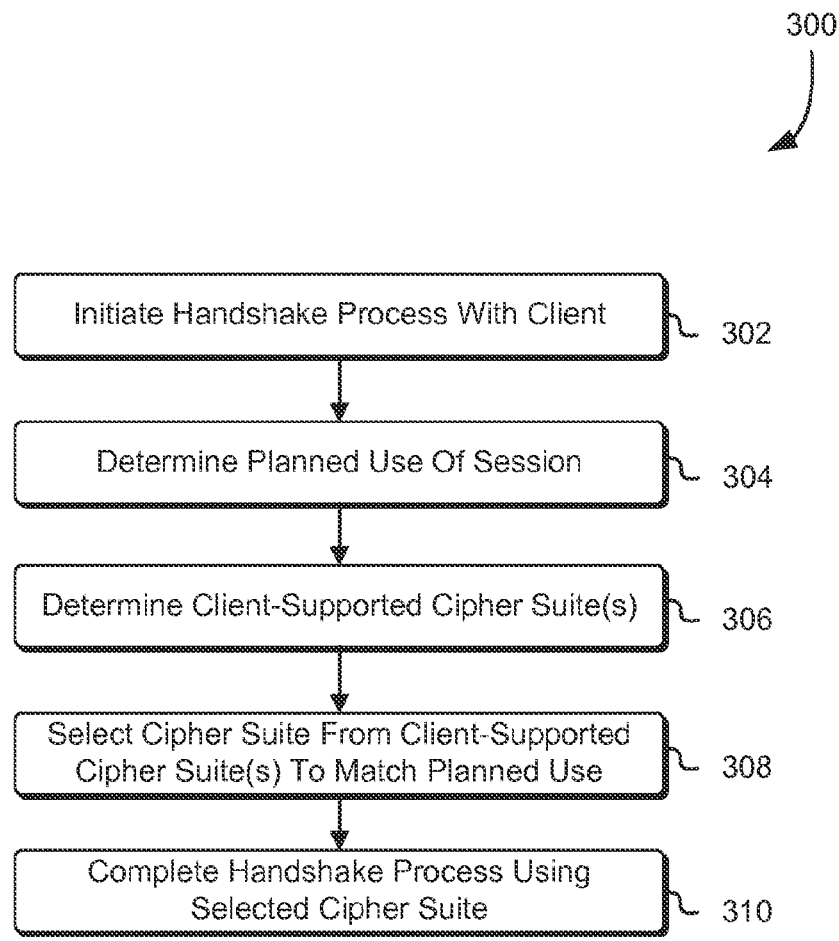
FIG. 3 shows an illustrative example of a process for performing a handshake process in accordance with an embodiment.

FIG. 3 shows an illustrative example of a process 300 for performing a handshake in accordance with an embodiment. The process 300 may be performed by any suitable system such as a server computer system of a service front end such as described above in connection with FIG. 2. Note however, that the process 300 may be performed by any computer system that participates in a handshake process. In an embodiment the handshake process is a secure sockets layer (SSL) or transport layer security (TLS) handshake. Note however, the handshake process may be any handshake for establishment of a cryptographically protected communications session, such as a protocol for a cryptographically protected communications session which includes a handshake protocol and a record protocol. In an embodiment, a system performing the process 300 initiates 302 a handshake process with a client. The handshake process may be initiated 302 in various ways in accordance with various embodiments, and generally the way by which the handshake process is initiated 302 may vary in accordance with a particular protocol of which the handshake process is a part. In a specific example, the system performing the process 300 initiates 302 the handshake process by receiving a TLS ClientHello message from the client. The ClientHello message may list for example, a set of cipher suites supported by the client where the set may have a single cipher suite specified or may have multiple cipher suites specified. Generally, the handshake process may be initiated 302 by receiving or transmitting a message that causes the handshake process to initiate.

As part of establishing a cryptographically protected communications session, the process 300 may also include determining 304 a planned use of the cryptographically protected communications session to be established by performance of the handshake process. The planned use may be determined 304 in various ways in accordance with various embodiments. In some example, a system performing the process 300 is configured to recognize identifier of planned uses, and the client may have explicitly included one of the identifiers in a message to the system performing the process 300. As one example, a message from the client 302 which may be a ClientHello message, or another message, may have a value that indicates that the cryptographically protected communication session is to be used for data integrity, but not data confidentiality. As another example, a message from the client may include a value that indicates a security level of data to be accessed by the client through the submission of a request to the system performing the process 300. In some examples, the client may not explicitly indicate the determined planned use of the session, but may indicate the determined planned use of the session in other ways in accordance with various embodiments.

In some examples, a message from the client such a ClientHello message may indicate a resource to be requested by the client. A system performing the process 300 may access information associated with that resource and use that information to determine the planned use of the session. Metadata associated with the resource may, for instance, indicate a security level for the resource. As another example, a policy associated with the resource may have a condition that the resource may be transmitted over a network using any of a particular set of cipher suites. Other variations are also considered being within the scope of the present disclosure.

In addition to determining 304 the planned use of the session, the process 300 may include determining 306 a set of client-supported cipher suites. In some examples, the set of client-supported cipher suites is specified in a ClientHello or other message received from the client. Note however that other ways of determining a set of client supported cipher suites may be used (e.g., by referring to a database that associates client identifiers with supported cipher suites). Once a system performing the process 300 determines 304 the planned use of the session and determines 306 a set of client supported cipher suites, the process 300 may include selecting 308 a cipher suite from the set of client supported cipher suites to match the planned use that was determined 304.

As noted above, a planned use of a session may be matched to a cipher suite in various ways in accordance with various embodiments. In some examples, potential planned uses of cryptographically protected communication sessions are stored in a data store, such as a database, in association with suitable cipher suites. Accordingly, selection 308 of a cipher suite from the set of client supported suites that was determined 306 may include using the determined 304 planned use of the session to reference a set of client-supported cipher suites. In embodiments where multiple cipher suites supported by the client matched the determined planned use, a ranking or other mechanism may be used to select from the multiple cipher suites. The cipher suites may be ranked in various ways in accordance with various embodiments. In some examples, a system performing the process 300 is programmed with the cipher suites ranked in accordance with preference. The preferences for cipher suites may vary in accordance with planned use of sessions. For example, a set of cipher suites may be ranked in accordance with cryptographic strength such that the ranking can be used to select the most secure cipher suite of a set of suitable cipher suites when it determines planned use of the session is one corresponding to data security and confidentiality being of high importance. As another example, a set of cipher suites may be ranked in accordance with statistics regarding processing resources used when communicating in accordance with the various cipher suites. In this manner, when computational efficiency is more important for a planned use of a session, such a ranking may be used to select a most efficient cipher suite for the session. Other rankings may also be used, and the way in which cipher suites are ranked may vary in accordance with different characteristics of the cipher suites that are matched to different uses for a session.

Having selected 308 a cipher suite from the set of client supported cipher suites that match the planned use that was determined 304, a system performing the process 300 may complete 310 the handshake process using the selected cipher suite. The way in which the handshake process is completed 310 may vary in accordance with various embodiments. For instance, in the example of TLS, a server performing the process 300 may transmit a ServerHello message to the client, where the ServerHello message indicates to the client to use the selected 308 cipher suite. Other operations may also be performed and such operations may depend upon the particular implementation of the handshake process. In some examples, such as in some TLS implementations, completion 310 of the handshake process may include transmitting a server certificate, generating a random number and providing it to the client, calculation of a premaster secret, derivation of a set of cryptographic keys from the premaster secret (for the cryptographic algorithms of the cipher suite) and transmission or receipt of a change cipher spec (CCS) notification indicating that the entity is participating in the handshake process are to switch from a handshake protocol to a record protocol.

Figure 4:
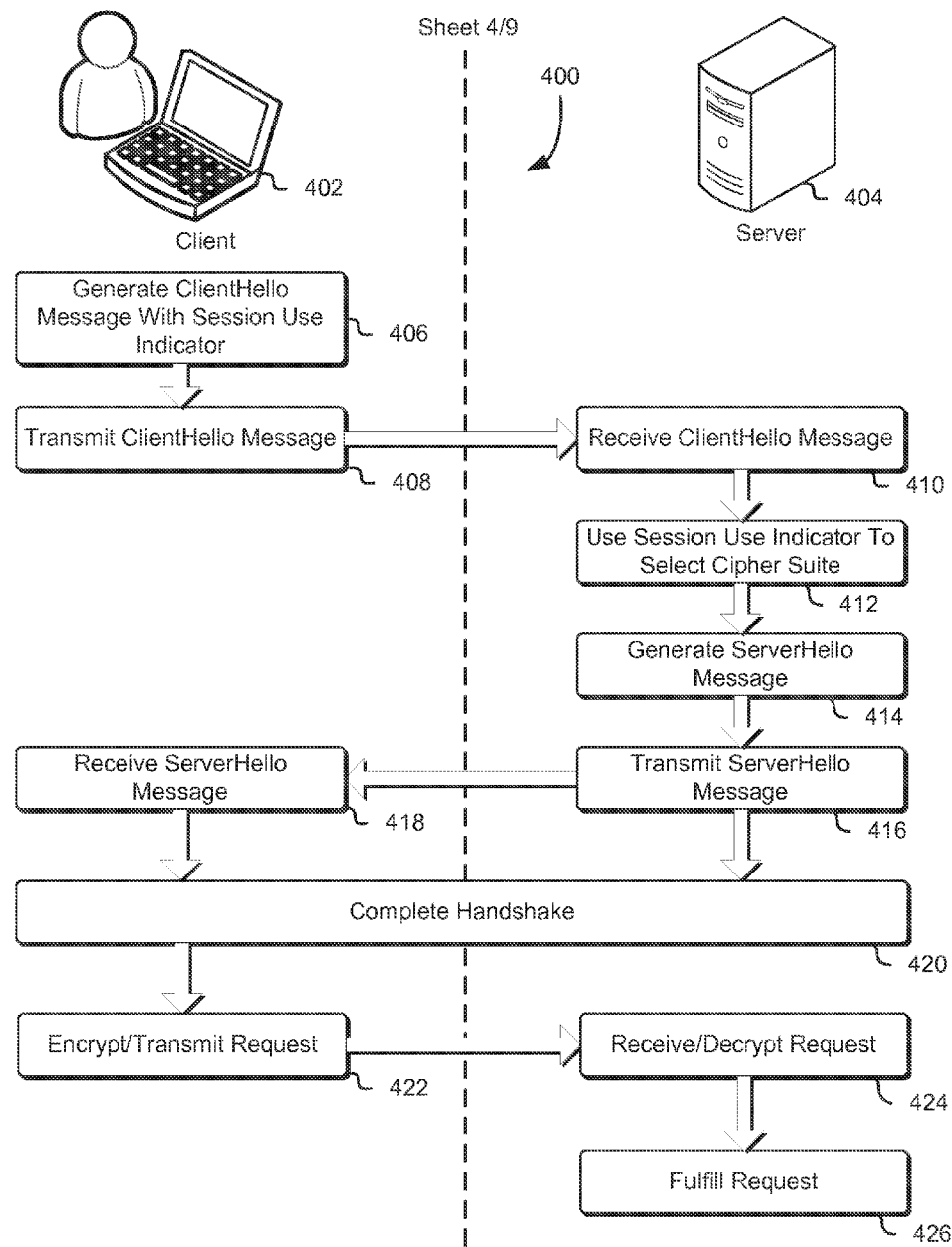
FIG. 4 shows a diagram illustrating communications between a client and a server in accordance with an embodiment.

FIG. 4 shows a diagram for 100 illustrating communications between a client 402 and a server 404. The client 402 may communicate with the server 404 for the purpose of accessing one or more resources accessible to the server 404. In the diagram 400, the client 402 begins by generating 406 a ClientHello message with a session use indicator. The ClientHello message may be a ClientHello message configured in accordance with an SSL or TLS protocol such as such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, and other protocols, such as protocols for secure communication that include a handshake.

The session use indicator may be a value in the ClientHello message that indicates to the server 404 a planned use for the session. As noted above, the session use indicator may indicate a use for the session in various ways in accordance with various embodiments. In some examples, the session use indicator explicitly indicates a use for the session using an identifier of a set of planned uses supported by the server 404. As another example, the use indicator may indicate a set of identifiers for a set of resources to be accessed over the session. The identifiers may, for instance, be uniform resource identifiers (URIs) of the resources such as uniform resource locators (URLs) used to identify the resources. As yet another example, a value in the ClientHello message may indicate a security level for the session. The security level may be one of multiple security levels supported by the server, that is, which the server 104 is programmed to recognize. Generally, the session use indicator is any value or set of values useable by the server 104 to determine a planned use for the cryptographically protected communications session to be established between the client 102 and the serve 104.

Having generated 406, the ClientHello message with the session use indicator, the client 402 may transmit 408 the ClientHello message to the server 404 over a network, such as the internet or another network discussed below. The server 404 accordingly may receive 410 the ClientHello message. To process the ClientHello message, the server 404 may use 412 the session use indicator from the ClientHello message to select 412, a cipher suite. As noted, selection of a cipher suite may be performed in various ways in accordance with various embodiments. In some embodiments, the ClientHello message lists a set of cipher suites supported by the client 402. The server 404 may accordingly select a cipher suite that both matches the session use indicator, and that is supported by the client 402. If multiple such cipher suites both match the session use indicator and are supported by the client 402, the server 404 may select a most preferred cipher suite from the multiple cipher suites. The preferences may be indicated in the ClientHello message or may be configured in the server 404. As noted above, preferences may be associated with different session use indicators such that the particular ranking of cipher suites used for selection of a most preferred cipher suite may depend on the specific session use indicator that was received from the client 402.

Having used the session use indicator to select 412 a cipher suite, the server 404 may generate 414 a ServerHello message. The ServerHello message may indicate to the client 402 which cipher suite the client 402 should use for the cryptographically protected communications session. The server may then transmit 416 the generated 414 ServerHello message to the client 402. The client may, accordingly, receive 418 the ServerHello message. Once the client 402 receives 418 the ServerHello message, the client 402 and server 404 may complete 420 a handshake process (referred to also as a handshake). A handshake may be completed in various ways in accordance with various embodiments, and generally, the way by which the handshake is completed may depend upon the specific protocol being used by the client 402 and the server 404. As noted above, the handshake may be, as an example, an SSL or TLS handshake.

Having completed 420 the handshake, the client 402 may then encrypt and transmit 422 a request to the server 404. The request may be for example, a hypertext transfer protocol (HTTP) get request, or another request such as a web service request, whose fulfillment involves access to a resource specified in the request. Generally the request may be any message formatted in accordance with a syntax supported by the server 404. The server 404 may then receive over the cryptographically protected communications session the request that the client 402 transmitted 422. The server 404 may receive and decrypt 424 the request and, if applicable, fulfill 426 the request. Fulfillment of the request may include, for example, accessing the resource in a manner corresponding to the request, e.g., accessing the resource from storage encrypting the resource using a key negotiated in the handshake process that was performed by the client 402 and the server 404, and transmitting a response that includes the resource to the client 402 which the client 402 may then decrypt and process. Note that while FIG. 4 shows the client 402 encrypting information that the server 404 decrypts as noted above, some examples may utilize protocols for establishing cryptographically protected communications sessions and using such sessions in a manner that provides data integrity but not confidentiality. As a result, the client 402 may for instance, not encrypt a request that the client 402 generated, but may simply transmit the request in unencrypted form to the server 404 which as a result of the request not having been encrypted may not decrypt the request, but may process the request if the request is determined to be authentic (e.g., not modified in transit). Other variations are also considered as being within the scope of the present disclosure.

Figure 5:
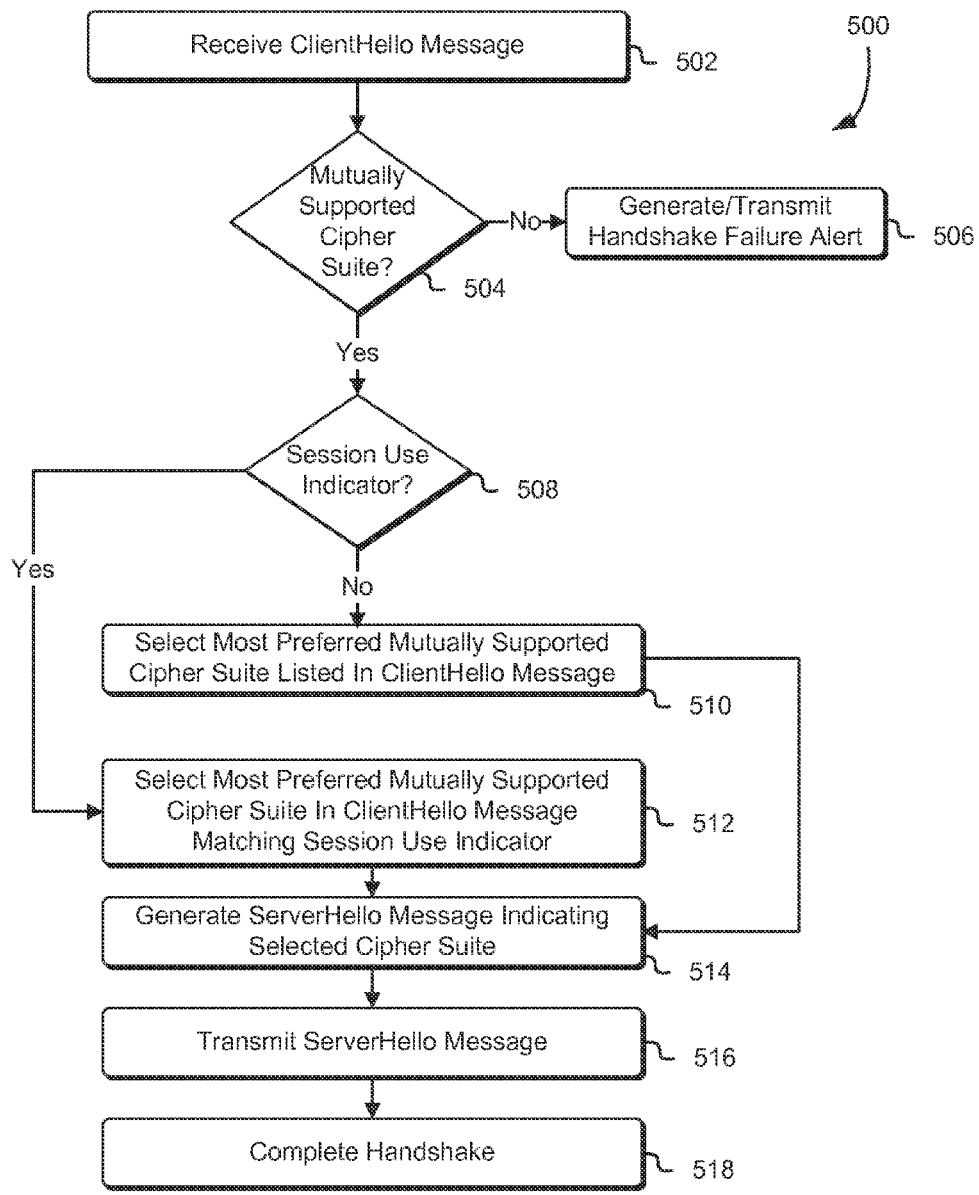
FIG. 5 shows a diagram illustrating a process for performing a handshake in accordance with an embodiment.

FIG. 5 shows an illustrative example of a process 500 that may be performed to perform a handshake in accordance with an embodiment. The process 500 may be performed by any suitable system such as a server computer system as noted above. Generally however, the process 500 may be performed by any system that participates in a handshake process. In an embodiment the process 500 includes receiving 502 a ClientHello message. The ClientHello message may be for instance, a TLS ClientHello message such as described above. The ClientHello message may be received 502 over a network, such as the Internet. In response to having received 502 the ClientHello message, the process 500 may include determining 504 whether there is a mutually supported cipher suite. A mutually supported cipher suite may be a cipher suite that is supported by both the system performing the process 500, and a system that transmitted the ClientHello message that was received 504. Determining 504 whether there is a mutually supported cipher suite may be performed for instance, by determining whether any cipher suites listed in the ClientHello message match a cipher suite that system performing the process 500 is configured to support.

If it is determined 504 that there are not mutually supported cipher suites, the process 500 may include generating and transmitting 506 a handshake failure alert, such as an alert configured in accordance with a TLS protocol. The handshake failure alert may be transmitted 506 to the system from which the ClientHello message was received 502. If it is determined however, that there is at least one mutually supported cipher suite, the process 500 may include determining 508 whether the ClientHello message included a session use indicator. The session use indicator may be a value in an extension of the ClientHello message, such as defined in RFC3546 which is incorporated herein by reference. The indicator may be in a server name indication (SNI) or other extension. If it is determined 508 that the ClientHello message did not include a session use indicator, a system performing the process 500 may select 510 a most preferred cipher suite listed in the ClientHello message that is mutually supported, that is, which is supported by the system that transmitted the ClientHello message that was received 502 and a system performing the process 500.

As noted above, cipher suite preferences may vary in accordance with various embodiments. In some examples, a listing of cipher suites in the ClientHello message is ordered in accordance with preference and such an ordering may be used to select 510 the most preferred mutually supported cipher suite listed in the ClientHello message. In other examples, a system performing the process 500 is configured with the configuration that specifies preferences for cipher suites supported by the system.

If it is determined 508 that the ClientHello message included a session use indicator, the system performing the process 500 may select 512 the most preferred mutually supported cipher suite listed in the ClientHello message that matches the session use indicator. As noted above in other examples, different session use indicators may have different corresponding preference orders and a preference order corresponding to the session use indicator that was received in the ClientHello message may be used to select 510 the most preferred mutually supported cipher suite listed in the ClientHello message. As yet another example, the session use indicator may include an identifier of a resource. A policy associated with the resource may specify an order of preference for cipher suites suitable for access to that resource. Note that other information may also be used to select the most preferred mutually-supported cipher suite. For example, preferences may depend on contextual information, such as described elsewhere herein. As an illustrative example, a ranking of cipher suites may be dependent on a geographic location from which the ClientHello message originated (which may be determined by a mapping of network addresses to geographic locations) such that, in some locations, one cipher suite would be most preferred while, in other locations, another cipher suite would be most preferred.

Having selected 512 the most preferred mutually-supported cipher suite in the ClientHello message matching the session use indicator, a system performing the process 500 may generate 514 a ServerHello message indicating the selected cipher suite. The ServerHello message may be for instance, a TLS ServerHello message, although other messages are also considered as being within the scope of the present disclosure. Turning to the embodiment illustrated in FIG. 5, the generated 514 ServerHello message may be transmitted 516 to a system from which the ClientHello message was received 502. Having transmitted 516 the ServerHello message system performing the process 500 may complete 518 the handshake. As noted above, a handshake may be completed in various ways in accordance with various embodiments and the manner in which the handshake is completed may depend on the particular protocol being used for the handshake. Once the handshake has completed, information may be transferred between systems involved in the handshake using a record protocol such as a TLS record protocol.

Note that the various techniques described herein use, for the purpose of illustration, dynamic selection of a cipher suite based at least in part of a planned use for a cryptographically protected communications session, a cipher suite being an example parameter for cryptographic protection of communications. The techniques described herein may also be used to select other parameters for cryptographic protection of communications in addition to or instead of cipher suites and to cause cryptographically protected communications sessions to be established accordingly. For instance, in some examples, the techniques described above may be used to select which protocol is used (e.g., which version of SSL and/or TLS) as a parameter for cryptographic protection of communications. As another example parameter for cryptographic protection of communications, a mode of a protocol to be used (e.g., whether client authentication is used) may be selected in accordance with techniques described above. Note further that access control enforcement (e.g., as described in more detail below) may also be based at least in part on such parameters in addition to or instead of cipher suites. For instance, whether a request whose fulfillment involves access to data may depend on the protocol selected in addition to or instead of the cipher suite that is selected.

Figure 6:
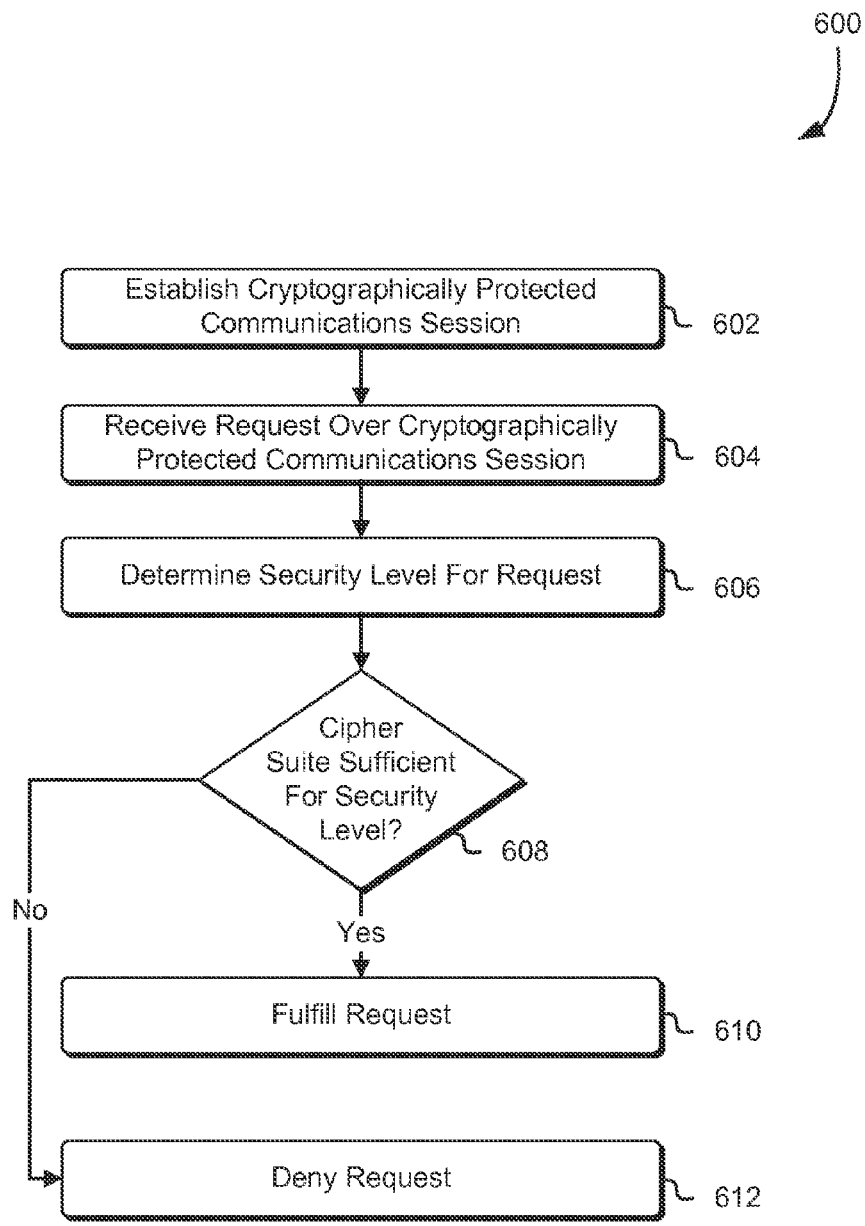
FIG. 6 shows an illustrative example of a process for processing a request in accordance with an embodiment.

As discussed above, various embodiments of the present disclosure utilize negotiated cipher suites in determinations whether to fulfill requests. FIG. 6 accordingly shows an illustrative example of a process 600 which may be used to process incoming requests in accordance with an embodiment. The process 600 may be performed by any suitable system such as a server computer system discussed above, although operations involved in the performance of the process 600 may be distributed among multiple components of a distributed system. In an embodiment, the process 600 includes establishing 602 a cryptographically protected communications session. The cryptographically protected communications session may be established 602 in various ways in accordance with various embodiments. In some examples, the cryptographically protected communications session 602 is established by performing a handshake, such as a TLS handshake or a variation thereof, such as by performing the process 500 discussed above in connection with FIG. 5.

Having established 602 the cryptographically protected communications session, a system performing the process 600 may receive 604 a request over the cryptographically protected communications session. The request may be, for instance, a web service application programming interface request. In examples where the cryptographically protected communications session utilizes data confidentiality, the request may be received 604 in encrypted form and while not shown in the figure, the process 600 may include decrypting the request such as by decrypting one or more records in accordance with the record protocol that encode the request. As noted above however, that communications transmitted over the cryptographically protected communications session are not necessarily encrypted in all examples.

Upon receipt 604 of the request over the cryptographically protected communications session, the process 600 may include determining 606 a security level for the request. The security level may be determined in various ways in accordance with various embodiments. In some examples, the request indicates the security level. In other examples, the request involves access to a resource identified in the request and the security level may be identified in metadata associated with the resource. In yet other examples, resources may be organized in logical data containers and the request may involve a resource in a particular logical data container and the logical data container may correspond to a specific security level. Other examples are also considered as being within the scope of the present disclosure. Having determined 606 the security level for the request, the process 600 may include determining 604 whether the cipher suite used for the cryptographically protected communications session is sufficient for the security level that was determined 606. As noted above, cipher suites may be associated with security levels and a system performing the process 600 may determine whether the determined 606 security level matches the cipher suite that is used the cryptographically protected communications session.

If it is determined 608 that the cipher suite of the cryptographically protected communications session is sufficient for the security level that was determined 606, the process 600 may include fulfilling 610 the request. Fulfillment of the request may occur in various ways in accordance with various embodiments and, in some examples, fulfillment of the request includes generating a response that includes the resource and transmitting the response over the cryptographically protected communications session. If it is determined 608 however, that the cipher suite is insufficient for the security level, the process 600 may include denying 612 the request. The request may be denied in various ways in accordance with various embodiments. In some examples, a message indicating denial of the request is transmitted over the cryptographically protected communications session. In some examples, the message indicated denial may indicate a reason for the denial thereby enabling a client computer system (referred to shortly as a "client") to perform mitigating operations such as, by renegotiating a different cryptographically protected communications session that utilizes a cipher suite that is sufficient for the security level that was determined 304.

Numerous variations are considered as being within the scope of the present disclosure, including variations discussed above. For instance, instead of denying 612 the request as soon as it is determined 608 that the cipher suite is insufficient for the security level, a system may transmit a message that causes a renegotiation of the cryptographically protected communications session in an attempt to negotiate a cryptographically protected communications session that utilizes a cipher suite that is sufficient for the security level. An example such message is a TLS Hello Request message. If such a renegotiation is successful the request may then be fulfilled, and data responsive to the request may be transmitted over the renegotiated cryptographically protected communications session that utilizes the cipher suite that is sufficient for the security level.

As another example, an application-layer indication may be transmitted to the client. Such a communication may, for instance, cause a client computer system to produce a visual or other alert in a graphical or other user interface. Such an alert may indicate the insufficiency of the cipher suite and may provide an option for continuing or otherwise proceeding (e.g., negotiating a new cryptographically protected communications session.) A visual alert may be, for instance, in the form of a modal pop up box with an interface element that a user may select to indicate a course of action. Application layer alerts may also be used to enable an automated process on the client determine how to proceed.

If the server receives an indication how to proceed back, the server may fulfill or deny the request accordingly. In some examples, whether the server trusts such an indication may depend on the current cipher suite being used in the session so that, for instance, such indications are only trusted for certain cipher suites. Other variations are also considered as being within the scope of the present disclosure.

Figure 7:
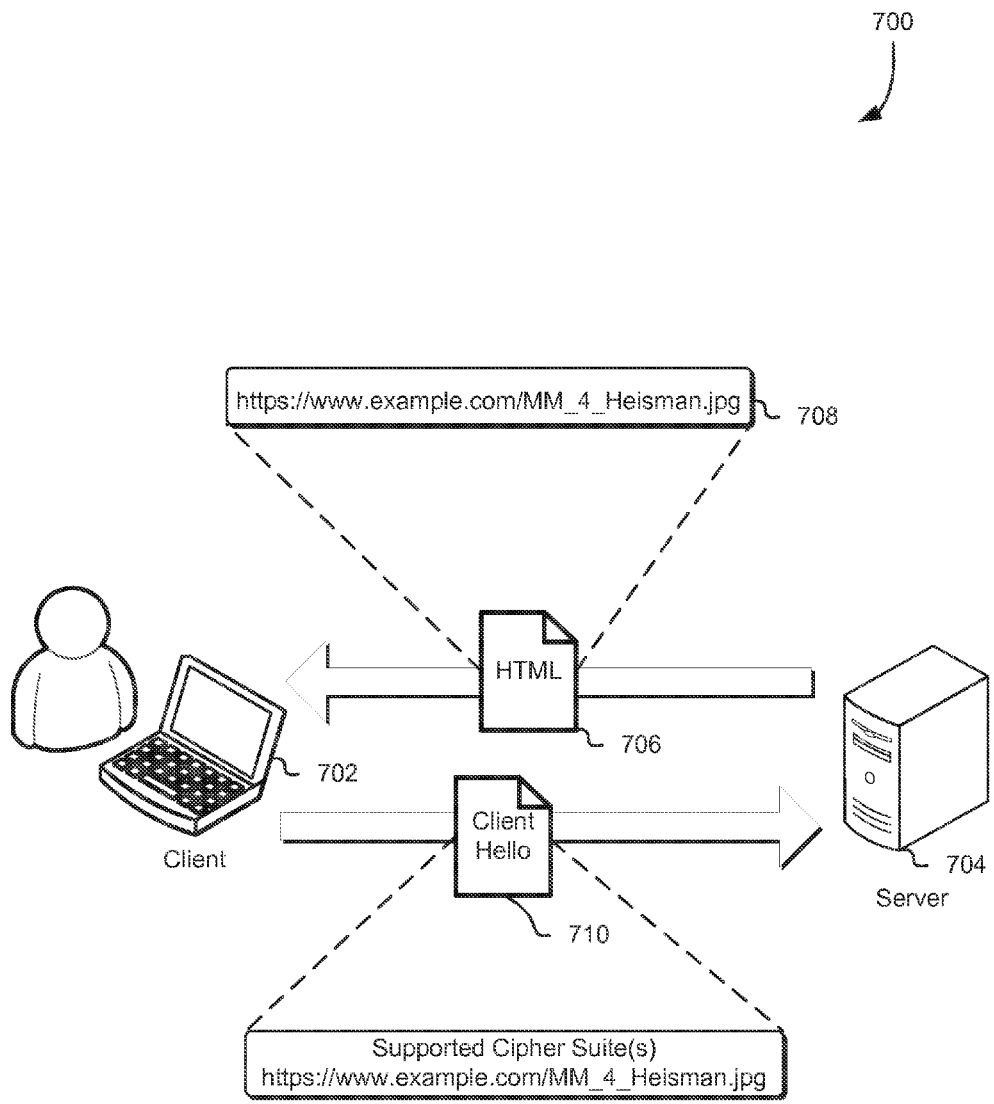
FIG. 7 shows a diagram illustrating various aspects of the present disclosure.

FIG. 7 shows a diagram 700 illustrating a context in which various techniques of the present disclosure may be utilized. In this particular example, the diagram 700 shows a client 702 and a server 704 which may be the client and server such as described above. In an embodiment the server 704 transmits a hypertext markup language (HTML) document 706 to the client 702. The client 702 for example, may have submitted a request to the server 704 over an unencrypted channel for the document 706. As illustrated in FIG. 7, the HTML document 706 may include various information such as HTML code and part of the html code may include a URL 708. In this particular example, the URL 708 includes "HTTPS," which serves as an indicator of cryptographic protection of communications, that is, which indicates that a request for a resource identified by the URL 708 should be made over a cryptographically protected communications channel and, in particular, such a request should be made as a hypertext transfer protocol (HTTP) request over SSL/TLS. Further, in this example, the URL 708 refers to an image file, although other resources are considered as being within the scope of the present disclosure.

Either automatically or in response to user input to the client 702, depending on how the URL 708 is encoded in the HTML document 706, the client 702 may transmit a ClientHello message 710 to the server 704 to initiate a handshake process to establish a cryptographically protected communications channel over which the resource identified by the URL 708 should be transferred. The ClientHello message may be for example, a TLS ClientHello message such as described above. Accordingly, the ClientHello message 710 may specify a set of supported cipher suites, that is, a set of cipher suites supported by the client 702, and an extension to the ClientHello message 710 may specify the URL 708 thereby indicating to the server 704 a planned use of a cryptographically protected communications session to be established between the client 702 and the server 704. The ClientHello message may, for instance, include the URL in plaintext, provide an encrypted copy of the URL (decryptable by the server, for instance, by being encrypted using a public cryptographic key of a public-private key pair associated with the server), provide an anonymized URL that is generated based at least in part on the URL, and/or other information specific to the URL.

The server 704 may receive the ClientHello message and may complete a handshake process with the client 702 such as in accordance with FIG. 5. The server 704 assuming successful completion of the handshake process may establish a cryptographically protected communications channel with the client 702, and may transfer the image file to the client 702 over a network for rendering by the client 702 or other processing, which may be dependent on how the URL 708 is encoded in the HTML document 706 and also dependent on programming logic of the client 702.

Numerous variations of the example illustrated in FIG. 7 are considered as being within the scope of the present disclosure. For example, in some examples, URLs are encoded on web pages and a single HTML document may have multiple URLs with an "https" designation. A client may be configured to aggregate such URLs into a single client hello message (e.g., in a list). The server may use each of the URLs in determining a cipher suite. As noted above, each resource corresponding to a URL may have a corresponding set of preferences and a different mutually supported cipher suite may be most preferred for different resources. The server may be configured with a global ranking of preferences, for instance, based at least in part on cryptographic strength. In such instances, the server may first determine a most preferred cipher suite for each of the references corresponding to the URLs (thereby obtaining a set of mutually supported cipher suites), then use the global ranking to select from the set of mutually supported cipher suites.

As yet another example considered as being within the scope of the present disclosure, the client 702 may establish multiple transmission control protocol (TCP) connections with the server 704 and may use different TCP sessions for different planned uses. In this manner, the client can establish different cryptographically protected communications sessions over different TCP connections and use each session for a different planned use (e.g., allocating requests according to planned use), thereby gaining efficiencies by more closely matching requests to cipher suites most appropriate for the requests.

As noted above, various techniques of the present disclosure involve selectively providing access to resources based at least in part on cipher suites that have been negotiated. Further as noted above in some examples, requests may be denied as a result of a cipher suite that was negotiated being insufficient for fulfillment of a request. Various techniques of the present disclosure allow for flexibility and dynamic changing of cipher suites so as to provide more flexibility while still maintaining efficiencies gained through the various techniques described herein.

Figure 8:
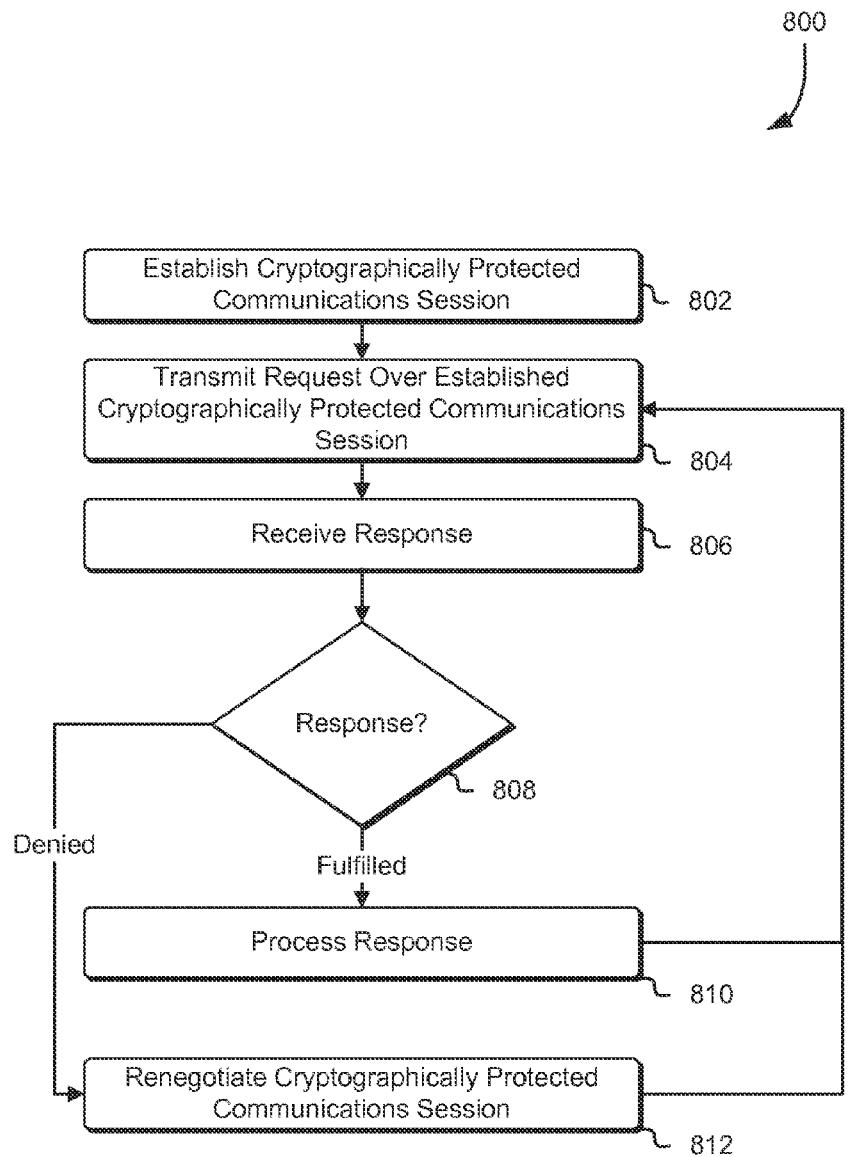
FIG. 8 shows a diagram illustrating a process for updating a cryptographically protected communications session in accordance with an embodiment.

FIG. 8 accordingly shows an illustrative example of a process 800 for dynamically updating cipher suites in accordance with an embodiment. The process 800 may be performed by any suitable computer system such as a client computer system such as described above. However, as with all processes described herein other computer systems may also perform the process 800. For example, the process 800 may be performed by any computer system that is configured to transmit requests. In an embodiment the process 800 includes establishing 802 a cryptographically protected communications session. The cryptographically protected communications session may be for example, a TLS session.

Having established 802 the cryptographically protected communications session, the process 800 may include transmitting 804 a request over the established cryptographically protected communications session. A response to the request may be received 806. The response may for example, include data that was obtained as part of fulfillment of the request or may be a denial to the request. Accordingly, in an embodiment a system performing the process 800 determines 808 what type of response was received 806. In an embodiment responses are either fulfilled or denied, although alternate embodiment of the present disclosure may have different types of responses such as partially fulfilled responses which may be also considered as partially denied responses.

Returning to the illustrative example shown in FIG. 8, a system performing the process 800 if it determines 808 that the response was fulfilled may process 810 the response. Processing 810 the response may occur in various ways in accordance with various embodiments and generally may depend upon the application that caused the request to be transmitted. As an illustrative example, if the request was a request for an image file, processing 810 the response may include causing the image file to be rendered on a display device and/or stored in a data storage device. More generally, if the response includes data for rendering, the data may be rendered, visually, audibly, and/or otherwise. Generally, the data that may be transmitted utilizing various techniques herein may vary in accordance with which the data is used.

If the system performing the process 800 determines 808 that the response has been denied, a system performing the process 800 may then renegotiate 812 a cryptographically protected communications session with the same computer system, or a different computer system, such as a different server computer in a fleet of redundant server computer systems. For example, if using TLS a system performing the process 800 may transmit a ClientHello message for a renegotiation such as described in RFC5746, which is incorporated herein by reference, and completing a handshake.

Numerous variations of the techniques described above are considered as being within the scope of the present disclosure. For example, as noted above, different cipher suites may be used for different uses of cryptographically protected communications sessions. In some examples, a client computer system may establish multiple cryptographically protected communications sessions with a server computer system or with a set of computer server systems (e.g., a set of redundant server computer systems) where the different cryptographically protected communications systems utilize different cipher suites. The client may selectively transmit requests over different cryptographically protected communications sessions thereby operating more efficiently by matching requests to appropriate cipher suites. A client for example, may establish multiple transmission control protocol (TCP) connections with the same server or different TCP connections with different servers and may establish a cryptographically protected communications session over each TCP connection. The client may map the cryptographically protected communications sessions to various uses either directly or indirectly, such as described above, and may transmit requests in accordance with the mapping. Other variations are also considered as being within the scope of the present disclosure.

Figure 9:
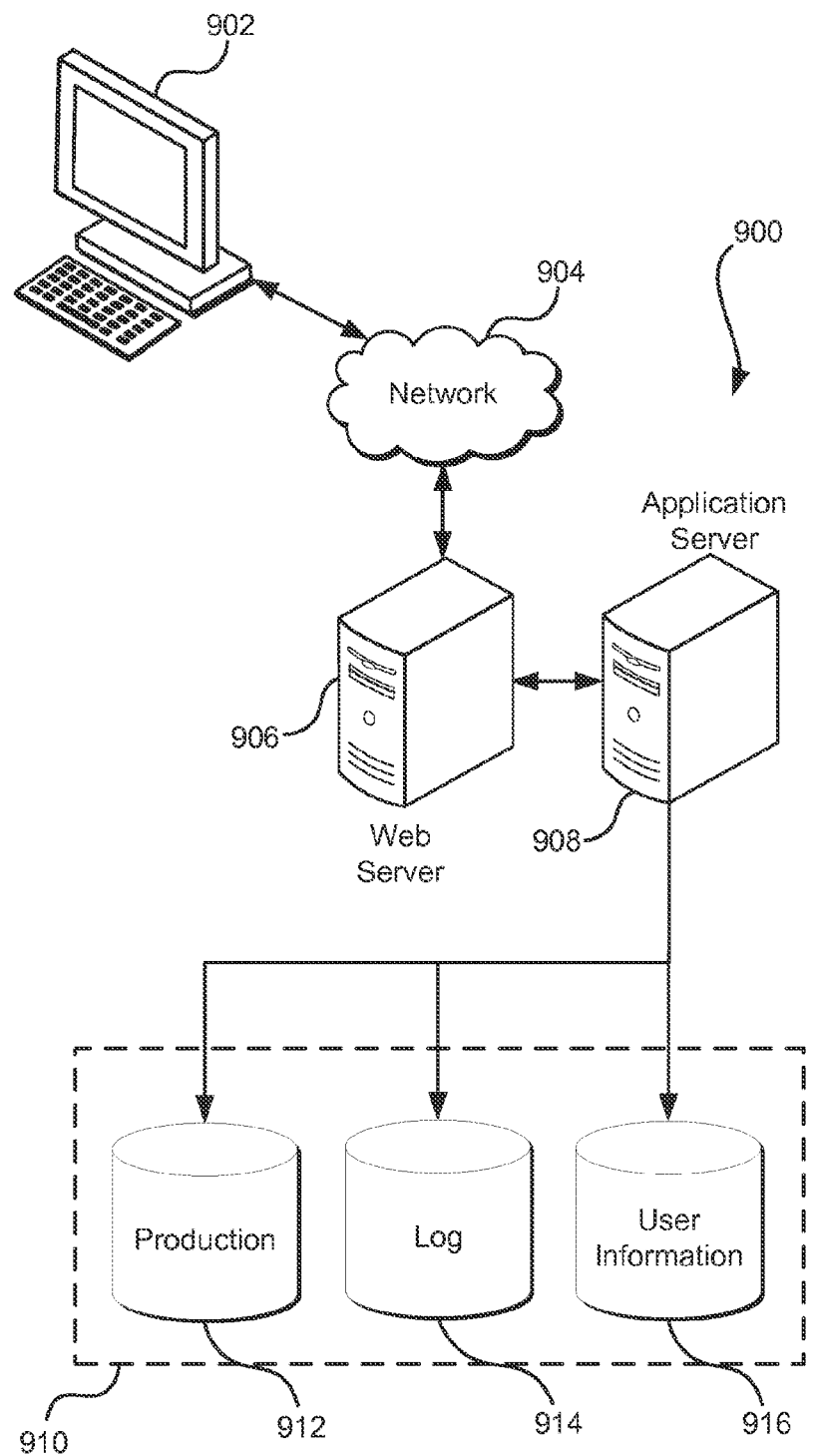
FIG. 9 shows an illustrative example of an environment in which various embodiments can be practiced.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Embodiments of the disclosure can be described in view of the following clauses:

1. A computer-implemented method, comprising:
under the control of one or more computer systems configured with executable instructions,
receiving, from a client computer system, a message to perform a handshake process to establish a cryptographically protected communications session, the message specifying a set of cipher suites supported by the client computer system and indicating a planned use of the cryptographically protected communications session;
selecting, based at least in part on the indicated planned use of the cryptographically protected communications session, a cipher suite from the specified set of cipher suites supported by the client computer system;
completing the handshake process to establish the cryptographically protected communications session such that the cryptographically protected communications session utilizes the selected cipher suite; and
communicating with the client computer system using the selected cipher suite in accordance with a record protocol.

2. The computer-implemented method of clause 1, wherein:
the planned use is from a plurality of planned uses;
different planned uses of the plurality of planned uses have corresponding rankings of cipher suites; and
selecting the cipher suite is based at least in part on a ranking of cipher suites associated with the indicated planned use.

3. The computer-implemented method of clause 1 or 2, wherein the message is a ClientHello message.

4. The computer-implemented method of any of clauses 1-3, wherein the indicated planned use is an identifier of a data object.

5. A system, comprising at least one computing device configured to implement one or more services, the one or more services configured to:
determine a planned use of a cryptographically protected communications session;
select, based at least in part on the determined planned use of the cryptographically protected communications session, a set of parameters for cryptographic protection;
establish, with another system, the cryptographically protected communications session in accordance with the selected set of parameters; and
communicate with the other system over the established cryptographically protected communications session.

6. The system of clause 5, wherein the one or more services are configured to determine the planned use from a message received as part of a handshake process performed to establish the cryptographically protected communications session.

7. The system of clause 5 or 6, wherein the one or more services are configured to determine the planned use based at least in part on an identifier of a resource specified by the other system.

8. The system of any of clauses 5-7, wherein the one or more service are configured to determine the planned use based at least in part on an identifier of a security level specified by the other system.

9. The system of any of clauses 5-8, wherein the one or more services are further configured to deny a request received over the cryptographically protected communications session as a result of the selected set of parameters failing to satisfy a set of conditions associated with a resource to be accessed as part of fulfillment of the request.

10. The system of any of clauses 5-9, wherein set of parameters specifies a cipher suite that includes a data authentication algorithm but lacks a data encryption algorithm.

11. The system of any of clauses 5-10, wherein:
the one or more services are further configured to:
  receive a message identifying a resource; and
  obtain access control information associated with the identified resource;
the one or more services are configured to select the set of parameters based at least in part on the access control information.

12. The system of any of clauses 5-11, wherein:
the cryptographically protected communications session is in accordance with a protocol that includes a handshake protocol and a record protocol;
the one or more services are configured to:
  select, for the set of parameters, a cipher suite as part of a handshake process performed in accordance with the handshake protocol; and
  communicate with the other system in accordance with the record protocol.

13. A non-transitory computer-readable storage medium having stored thereon executable instructions that, when executed by one or more processors of a computer system, cause the computer system to at least:
determine an indication of a planned use of a cryptographically protected communications session;
generate a message that includes the indication of the planned use of the cryptographically protected communications session;
transmit the message to another computer system as part of a handshake process to establish the cryptographically protected communications session, thereby causing the other computer system to select a set of parameters for cryptographic protection of communications based at least in part on the indication of the planned use of the cryptographically protected communications session; and
communicate with the other computer system over the cryptographically protected communications session in accordance with the selected cipher suite.

14. The non-transitory computer-readable storage medium of clause 13, wherein:
the instructions further comprise instructions that, when executed by the one or more processors, cause the computer system to determine, based at least in part on the determined indication, a proper subset of a set of cipher suites supported by the computer system; and
the instructions that cause the computer system to generate the message, when executed by the one or more processors, cause the computer system to specify the determined proper subset in the generated message.

15. The non-transitory computer-readable storage medium of clause 13 or 14, wherein the message is configured according to a handshake protocol of a protocol used for the cryptographically protected communications session.

16. The non-transitory computer-readable storage medium of any of clauses 13-15, wherein the indication of the planned use specifies a security level.

17. The non-transitory computer-readable storage medium of any of clauses 13-16, wherein the instructions further comprise instructions that, when executed by the one or more processors, cause the computer system to:
transmit, over the cryptographically protected communications session, a request;
as a result of the request being denied, renegotiate the cryptographically protected communications session to establish a different cryptographically protected communications session that utilizes a different cipher suite; and
retransmit the request over the different cryptographically protected communications session.

18. The non-transitory computer-readable storage medium of any of clauses 13-17, wherein the instructions further comprise instructions that, when executed by the one or more processors, cause the computer system to:
detect a new planned use different from the determined planned use;
renegotiate the cryptographically protected communications session to establish a different cryptographically protected communications session that utilizes a different set of parameters for cryptographic protection of communications.

19. The non-transitory computer-readable storage medium of any of clauses 13-18, wherein the instructions further include instructions that, when executed by the one or more processors, cause the computer system to:
receive a uniform resource locator indicating cryptographic protection of communications and identifying a resource;
initiate a handshake process to establish the cryptographically protected communications session; and include the information based at least in part on the uniform resource locator in a message transmitted as part of the handshake process.

20. The non-transitory computer-readable storage medium of any of clauses 13-19, wherein the cryptographically protected communications session is a transport layer security session.

21. A computer-implemented method, comprising:
under the control of one or more computer systems configured with executable instructions,
performing a handshake process to establish a cryptographically protected communications session, the established cryptographically protected communications session utilizing a cipher suite negotiated during the handshake process;
receiving, over the established cryptographically protected communications session, a request for data;
accessing access control information associated with the data specified in the request that indicates a set of cipher suites suitable for transfer of the data specified in the request;
generating a determination, based at least in part on whether the negotiated cipher suite is a member of the set of cipher suites suitable for transfer of the data specified in the request, whether to fulfill the request; and
processing the request in accordance with the generated determination.

22. The computer-implemented method of clause 21, wherein the cryptographically protected communications session is a transport layer security session.

23. The computer-implemented method of clause 21 or 22, wherein generating the determination is further based at least in part on a source network address specified in the request.

24. The computer-implemented method of any of clauses 21-23, wherein, as a result of a negative determination to fulfill the request, processing the request includes transmitting a message that causes the cryptographically protected communications session to be renegotiated to establish a new cryptographically protected communications session that utilizes a different cipher suite that is in the set of cipher suites suitable for transfer of the data.

25. A system, comprising at least one computing device configured to implement one or more services, wherein the one or more services are configured to:
receive, over a cryptographically protected communications session, a request whose fulfillment involves providing data, the cryptographically protected communications session utilizing a set of parameters for cryptographic protection of communications;
determine, based at least in part on the set of parameters and access control information associated with the data, whether to fulfill the request, thereby resulting in a determination of whether to fulfill the request; and
operate in accordance with the determination.

26. The system of clause 25, wherein:
the data is stored in a logical data container; and
the access control information is associated with the data by being associated with the logical data container.

27. The system of clause 25 or 26, wherein the one or more services are configured to operate in accordance with the determination by at least, if the determination is that the determination is to not fill the request, the one or more services provide an opportunity to renegotiate a different encrypted communications session utilizing a different set of parameters for cryptographic protection of communications prior to the request being denied.

28. The system of any of clauses 25-27, wherein fulfillment of the request includes providing data identified in the request.

29. The system of any of clauses 25-28, wherein the access control information is an access control policy specific to a data object involved in fulfillment of the request.

30. The system of any of clauses 25-29, wherein the one or more services are configured to determine whether to fulfill the request further based at least in part on contextual information of the request.

31. The system of any of clauses 25-30, wherein the one or more services are configured to determine whether to fulfill the request based at least in part on an identity of a requestor.

32. The system of any of clauses 25-31, wherein the access control information comprises metadata of the data involved in fulfilling the request.

33. A non-transitory computer-readable storage medium having stored thereon executable instructions that, when executed by one or more processors of a computer system, cause the computer system to at least:
transmit a request to another computer system over a first cryptographically protected communications session utilizing a first set of parameters for cryptographic protection of communications;
receive a response to the request that indicates unfulfillment of the request due to the first set of parameters being unsuitable for fulfillment of the request;
as a result of the response indicating denial of the request due to the first set of parameters being unsuitable for fulfillment of the request, establish a second cryptographically protected communications session that utilizes a second set of parameters for cryptographic protection of communications; and
transmit the request over the second cryptographically protected communications session.

34. The non-transitory computer-readable storage medium of clause 33, wherein the instructions further comprise instructions that, when executed by the one or more processors, cause the computer system to selectively determine a set of supported parameters for cryptographic protection of communications to be presented as supported by the computer system based at least in part on a planned use of cryptographic protection of communications.

35. The non-transitory computer-readable storage medium of clause 33 or 34, wherein the response indicates denial of the request.

36. The non-transitory computer-readable storage medium of any of clauses 33-35, wherein the instructions that cause the computer system to establish the second cryptographically protected communications session, when executed by the one or more processors, cause the computer system to transmit a message of a handshake protocol that specifies a resource involved in fulfillment of the request.

37. The non-transitory computer-readable storage medium of any of clauses 33-36, wherein the first cryptographically protected communications session and the second cryptographically protected communications session are both in accordance with the same cryptographically protected communications protocol.

38. The non-transitory computer-readable storage medium of clause 37, wherein the cryptographically protected communications protocol is a transport layer security protocol.

39. The non-transitory computer-readable storage medium of any of clauses 33-38, wherein the response indicates a set of cipher suites suitable for fulfillment of the request and the second set of parameters specifies a cipher suite that is a member of the set of cipher suites suitable for fulfillment of the request.

40. The non-transitory computer-readable storage medium of any of clauses 33-39, wherein:
the first set of parameters corresponds to a first encryption algorithm;
the second set of parameters corresponds to a second encryption algorithm; and
the second encryption algorithm is cryptographically stronger than the first encryption algorithm.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems configured with executable instructions,
receiving, from a client computer system, a message to perform a handshake process to establish a cryptographically protected communications session, the message specifying a set of cipher suites supported by the client computer system and indicating a planned use of the cryptographically protected communications session the planned use being from a plurality of planned uses, different planned uses of the plurality of planned uses having corresponding rankings of cipher suites;
selecting, based at least in part on a ranking of cipher suites associated with the indicated planned use of the cryptographically protected communications session, a cipher suite from the specified set of cipher suites supported by the client computer system;

completing the handshake process to establish the cryptographically protected communications session such that the cryptographically protected communications session utilizes the selected cipher suite; and
communicating with the client computer system using the selected cipher suite in accordance with a record protocol.

2. The computer-implemented method of claim 1, wherein the message is a ClientHello message.

3. The computer-implemented method of claim 1, wherein the indicated planned use is an identifier of a data object.

4. A system, comprising:
one or more processors; and
memory including instructions that, as a result of execution by the one or more processors, cause the system to implement one or more services, the one or more services configured to:
determine a planned use of a cryptographically protected communications session the planned use being from a plurality of planned uses different planned uses of the plurality of planned uses having corresponding rankings of cipher suites;
select, based at least in part on a ranking of cipher suites associated with the determined planned use of the cryptographically protected communications session, a set of parameters for cryptographic protection;
establish, with another system, the cryptographically protected communications session in accordance with the selected set of parameters; and
communicate with the other system over the established cryptographically protected communications session.

5. The system of claim 4, wherein the one or more services are configured to determine the planned use from a message received as part of a handshake process performed to establish the cryptographically protected communications session.

6. The system of claim 4, wherein the one or more services are configured to determine the planned use based at least in part on an identifier of a resource specified by the other system.

7. The system of claim 4, wherein the one or more services are configured to determine the planned use based at least in part on an identifier of a security level specified by the other system.

8. The system of claim 4, wherein the one or more services are further configured to deny a request received over the cryptographically protected communications session as a result of the selected set of parameters failing to satisfy a set of conditions associated with a resource to be accessed as part of fulfillment of the request.

9. The system of claim 4, wherein a set of parameters specifies a cipher suite that includes a data authentication algorithm but lacks a data encryption algorithm.

10. The system of claim 4, wherein:
the one or more services are further configured to:
receive a message identifying a resource; and
obtain access control information associated with the identified resource; and
the one or more services are configured to select the set of parameters based at least in part on the access control information.

11. The system of claim 4, wherein:
the cryptographically protected communications session is in accordance with a protocol that includes a handshake protocol and a record protocol; and
the one or more services are configured to:
select, for the set of parameters, a cipher suite as part of a handshake process performed in accordance with the handshake protocol; and
communicate with the other system in accordance with the record protocol.

12. A non-transitory computer-readable storage medium having stored thereon executable instructions that, as a result of being executed by one or more processors of a computer system, cause the computer system to at least:
determine an indication of a planned use of a cryptographically protected communications session the planned use being from a plurality of planned uses different planned uses of the plurality of planned uses having corresponding rankings of cipher suites;
generate a message that includes the indication of the planned use of the cryptographically protected communications session;
transmit the message to another computer system as part of a handshake process to establish the cryptographically protected communications session, thereby causing the other computer system to select based at least in part on a ranking of cipher suites associated with the planned use, a set of parameters for cryptographic protection of communications based at least in part on the indication of the planned use of the cryptographically protected communications session; and
communicate with the other computer system over the cryptographically protected communications session in accordance with the selected cipher suite.

13. The non-transitory computer-readable storage medium of claim 12, wherein:
the instructions further comprise instructions that, when executed by the one or more processors, cause the computer system to determine, based at least in part on the determined indication, a proper subset of a set of cipher suites supported by the computer system; and
the instructions that cause the computer system to generate the message, when executed by the one or more processors, cause the computer system to specify the determined proper subset in the generated message.

14. The non-transitory computer-readable storage medium of claim 12, wherein the message is configured according to a handshake protocol of a protocol used for the cryptographically protected communications session.

15. The non-transitory computer-readable storage medium of claim 12, wherein the indication of the planned use specifies a security level.

16. The non-transitory computer-readable storage medium of claim 12, wherein the instructions further comprise instructions that, when executed by the one or more processors, cause the computer system to:
transmit, over the cryptographically protected communications session, a request;
as a result of the request being denied, renegotiate the cryptographically protected communications session to establish a different cryptographically protected communications session that utilizes a different cipher suite; and
retransmit the request over the different cryptographically protected communications session.

17. The non-transitory computer-readable storage medium of claim 12, wherein the instructions further comprise instructions that, when executed by the one or more processors, cause the computer system to:

detect a new planned use different from the determined planned use; and renegotiate the cryptographically protected communications session to establish a different cryptographically protected communications session that utilizes a different set of parameters for cryptographic protection of communications.

18. The non-transitory computer-readable storage medium of claim 12, wherein the instructions further include instructions that, when executed by the one or more processors, cause the computer system to:

receive a uniform resource locator indicating cryptographic protection of communications and identifying a resource;

initiate a handshake process to establish the cryptographically protected communications session; and include information based at least in part on the uniform resource locator in a message transmitted as part of the handshake process.

19. The non-transitory computer-readable storage medium of claim 12, wherein the cryptographically protected communications session is a transport layer security session.

20. The computer-implemented method of claim 1, wherein the planned use corresponds to a security level indicated in the message.

* * * * *